June 25, 1963 V. J. JOKELA 3,095,487
CONTROL APPARATUS
Filed Dec. 28, 1959 2 Sheets-Sheet 1

INVENTOR.
VEIKKO J. JOKELA
BY Robert S. Craig
ATTORNEY

INVENTOR.
VEIKKO J. JOKELA ized June 25, 1963

3,095,487
CONTROL APPARATUS
Veikko J. Jokela, Plymouth Village, Minn., assignor to Minneapolis-Honeywell Regulator Company, Minneapolis, Minn., a corporation of Delaware
Filed Dec. 28, 1959, Ser. No. 862,273
11 Claims. (Cl. 200—140)

This invention is directed to ambient temperature compensation of fluid transmission systems and is particularly concerned with such compensation as applied to remote bulb thermometers and thermostats.

It is well known in remote bulb temperature indicators to provide a second expansible chamber and capillary duplicating these parts of the sensing element, the two capillaries being run together as far as the bulb. A linkage is provided between the two expansible chambers to cancel out the effects of ambient temperature on the indicating member. However, where the device is called upon to sense temperature over a wide range, an additional factor becomes important. The volume of the chamber connected to the sensing bulb changes as a function of bulb temperature so that different amounts of ambient temperature compensation are required at different bulb temperatures. The same problem, of course, is encountered in liquid transmission systems generally.

An object of the invention is to provide an improved ambient temperature compensating arrangement for fluid transmission systems.

A further object is to provide an improved ambient temperature compensating mechanism for remote bulb temperature indicators and controllers.

In the one embodiment of the disclosed invention a liquid filled bulb, capillary and bellows is paralleled by a compensating capillarly and bellows filled with the same liquid. The compensating bellows shifts the axis of a control lever which is operated by the main bellows. This lever rotates a dial to indicate bulb temperature and also actuates a switch at a selected temperature. The switch actuating mechanism introduces an additional compensating effect to eliminate the error that would be caused by differences in volume of the two bellows due to bulb temperature.

Figure 1:
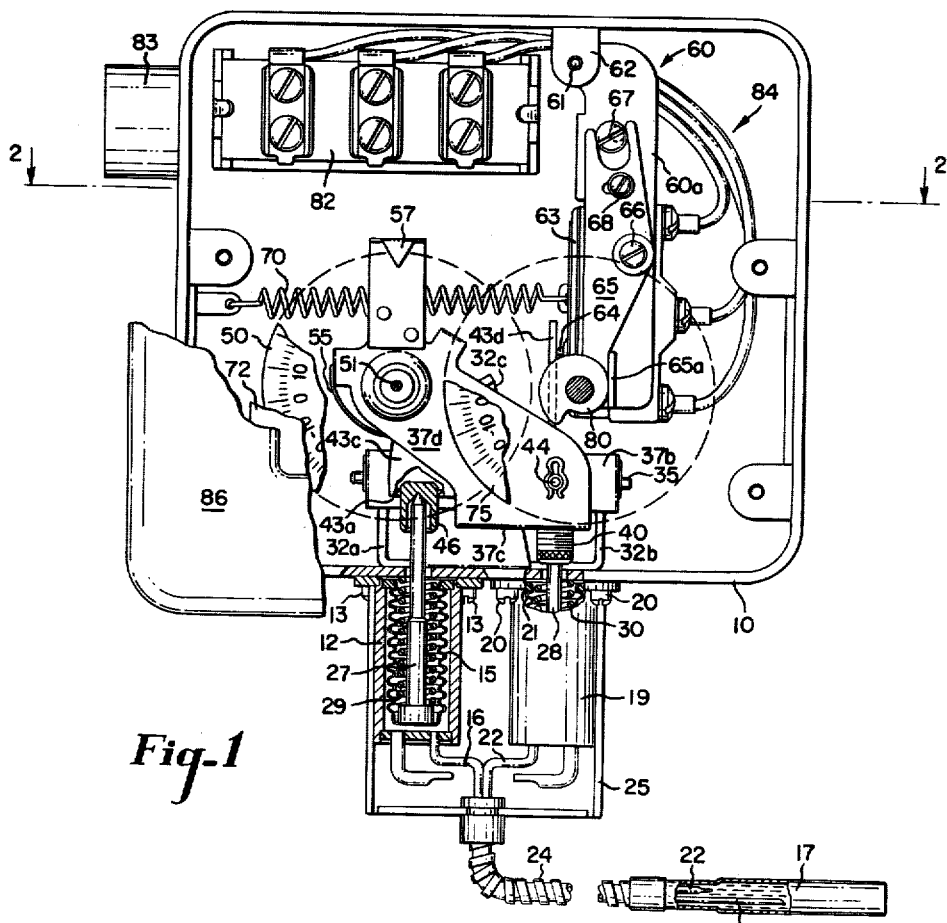
FIGURE 1 is an elevation, partly in section, of a temperature indicator and controller incorporating my invention, certain parts having been removed.
Figure 2:
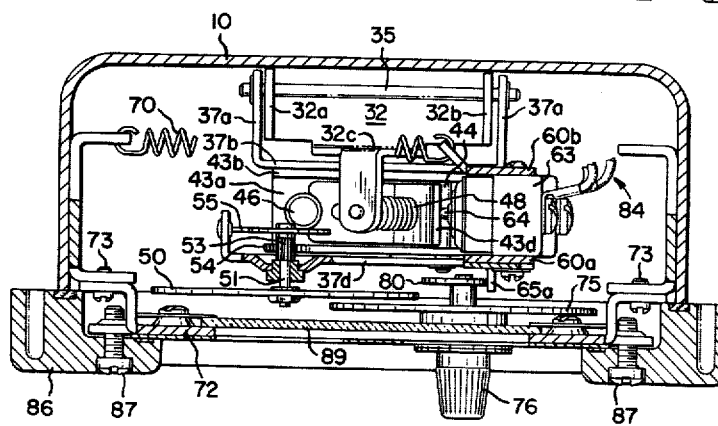
FIGURE 2 is a sectional view, taken along the lines 2—2 of FIGURE 1.
Figure 3:
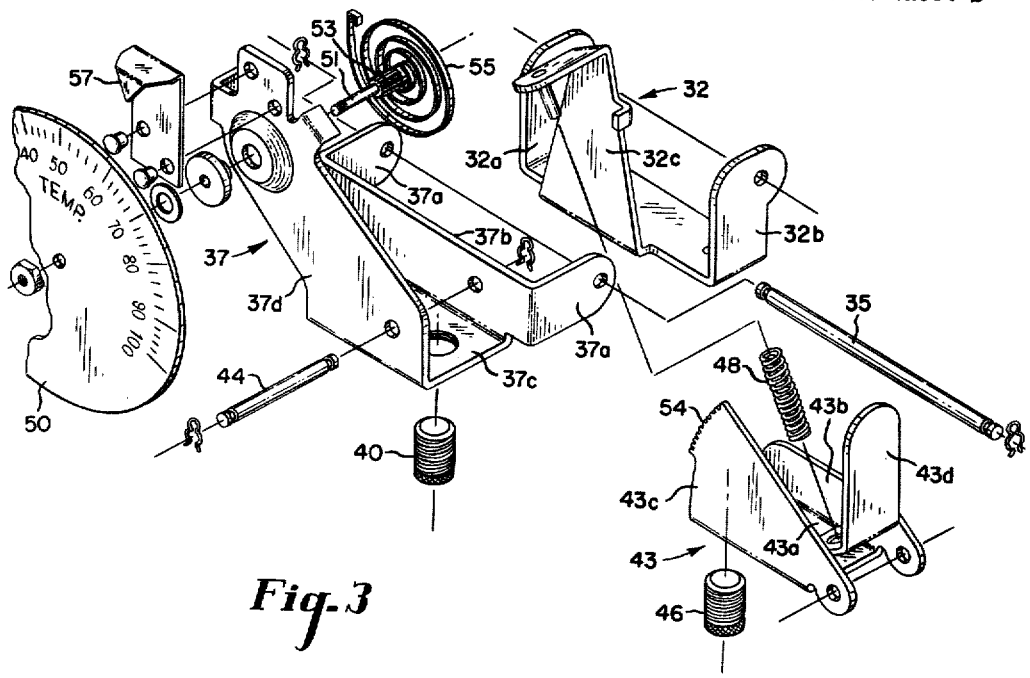
FIGURE 3 is an exploded view of the compound lever mechanism shown in FIGURES 1 and 2.

As seen in FIGURES 1, 2, and 3 the instrument has a case 10 in the form of a drawn sheet metal box with an open front. A liquid filled temperature sensing element has a cylindrical housing 12 secured to the bottom of case 10 by screws 13. A generally cup-shaped bellows 15 is secured at its open end to the upper end of housing 12 to form an expansible chamber which is in communication with a capillary tube 16 secured to the lower end of housing 12. The capillary is connected to a temperature sensing bulb 17 which may be located at a considerable distance from the instrument proper. The element is filled with a suitable liquid such as toluene.

A compensating element parallels and duplicates the expansible chamber and capillary of the sensing element, and consists of a cylindrical housing 19 secured to case 10 by screws 20, a bellows 21 within housing 19, and a capillary 22 which is enclosed in an armoured jacket 24 together with sensing capillary 16 and extends as far as the bulb but is not in communication therewith. One end of the armoured jacket 24 is attached to the bulb 17 while the other end is secured to a protective shroud 25 which encloses the housings 12 and 19.

An actuating plunger 27 engages the lower end of sensing bellows 15 and extends upwardly through an opening in case 10 to actuate a lever mechanism to be described hereinafter. Likewise, a plunger 28 engages the lower end of compensating bellows 21 and extends upwardly through an opening in case 10 to position the aforesaid lever mechanism. Springs 29 and 30 act between the case 10 and bellows 15 and 21 respectively to maintain a predetermined pressure in the liquid fills of the two elements.

A support 32 is centrally located on and carried by the lower part of the case 10 and has spaced parallel ears 32a and 32b carrying a pivot pin 35 on which an oscillatable bracket 37 is pivoted. Bracket 37 has a pair of rearwardly extending ears 37a through which the pin 35 passes, a flat vertical intermediate portion 37b connecting the ears 37a, a horizontal portion 37c extending forwardly from vertical portion 37b, and a second vertical portion 37d spaced from and parallel to portion 37b as shown most clearly in FIGURE 3. The bracket 37 is angularly positioned in case 10 by actuating plunger 28 of the compensating element in accordance with ambient temperature. The upper end of plunger 28 engages an abutment 40 which is screw threaded in bracket portion 37c. Preferably, the abutment 40 is adjusted in bracket 37 so that portion 37d is vertical at approximately the mid-point in the range of ambient temperatures, it is expected that the instrument will encounter.

A lever 43 is pivoted in bracket 37 on a pin 44 which extends through and is carried by bracket portions 37b and 37d normal to the pin 35 on which bracket 37 is pivoted. The lever 43 has a horizontally extending portion 43a connecting spaced parallel vertical portions 43b and 43c which are provided with ears through which pivot pin 44 extends. The lefthand end of lever 43 is positioned in case 10 by actuating plunger 27 of the temperature sensing element. The upper end of plunger 27 engages an abutment 46 which is screw threaded in lever portion 43a. Preferably the abutment 46 is adjusted so that lever portion 43a is horizontal when both ambient temperature and bulb temperature are at approximately the midpoints of their respective ranges.

The lever 43 is provided with a switch actuating portion 43d normal to portion 43a, to which it is secured and extending upwardly with its right hand, or switch actuating surface, lying in a plane through the pivotal axis of lever 43 in bracket 37. The support 32 is provided with a vertical extension 32c which carries one end of a compression spring 48, the lower end of which engages the lever 43 to the left of its pivotal axis to bias the lever 43 in a counter-clockwise direction. The spring 48 also acts through the lever 43 to bias the bracket 37 downwardly. Thus, abutment 40 on bracket 37 is biased into engagement with actuating plunger 28, an abutment 46 on lever 43 is biased into engagement with actuating plunger 27 so that the mechanism will follow changes in both bulb and ambient temperatures.

The front vertical portion 37d of oscillatable bracket 37 extends upwardly to carry a temperature indicating dial 50 that is mounted on a shaft 51 journalled in bracket 37. A pinion 53 on the inner end of shaftt 51 cooperates with a gear segment 54 formed integrally with front vertical portion 43c of lever 43 so that the indicating dial 50 will be positioned in accordance with the relative positions of lever 43 and bracket 37. A spiral hair spring 55 interconnecting shaft 51 and bracket 37 biases the shaft and pinion 53 in a clockwise direction to take up backlash with gear segment 54. The bracket portion 37d also carries a pointer 57 which cooperates with appropriate indicia on dial 50 to indicate bulb temperature.

A switch supporting bracket 60 is carried by a pivot pin 61 which is, in turn, carried by a bracket 62 secured to the upper portion of case 10. The switch supporting bracket 60 has spaced parallel portions 60a and 60b between which a precision snap switch 63 is carried. The switch 63 may be of the type disclosed in McGall 1,960,-020 and has the usual actuating plunger 64 which is disposed to be actuated by the righthand surface of lever portion 43d. A switch adjustment arm 65 is pivotally mounted by a screw 66 on the switch supporting bracket 60. The upper end of arm 65 is bifurcated to encompass an eccentric 67 that is pivotally carried in the bracket 60 to provide relative angular adjustment between the arm and the bracket. A lock screw 68 is provided to lock the arm after adjustment. The lower end 65a of arm 65 extends forwardly to provide a cam follower surface. A spring 70 acts between bracket 60 and the lefthand side of case 10 to bias the bracket 60 and switch 63 to the left.

A frame 72 extends across the front of case 10 and is secured thereto by screws 73. A control dial 75 is rotatably supported in the frame 72 and is provided with a knob 76 which extends from the front of the frame. Suitable windows are provided in frame 72 through which the indicating dial 50 and control dial 75 may be viewed. The frame 72 carries a pointer not shown, which cooperates with indicia of temperature on the control dial 75. A cam 80 is mounted on the inner part of the control dial assembly and cooperates with cam follower portion 65a on the switch supporting bracket 60 to adjust the position of switch 63 and its plunger 64 in accordance with the setting of control dial 75.

A terminal strip 82 is carried in case 10 adjacent a conduit connection 83 and is connected to the switch 63 by wires 84. As seen in FIGURE 2, a cover 86 is secured by screws 87 which engage the frame 72. The cover 86 cooperates with the frame 72 to enclose the mechanism within the case 10. The windows through which the dials are viewed are covered by glass 89 secured to the inner surface of frame 72.

It is desired that the temperature indicated by dial 50 and the control point of the switch 63 be determined only by bulb temperature and unaffected by the temperature of the liquid contained in the capillary 16 and in the space between housing 12 and bellows 15. At a bulb temperature approximately midway between the extremes of temperature to which the instrument is designed to respond, the sensing and compensating expansible chambers will contain the same volume of liquid. Since the bracket 37 and indicating dial are raised and lowered by the compensating expansible chamber in accordance with ambient temperature changes, corresponding movement of the lever 43 due to expansion or contraction of the sensing expansible chamber will cause no rotation of dial 50.

Likewise, at mid-range of bulb temperatures the switch actuating portion 43d of lever 43 will be vertical and changes in ambient temperature will merely result in the surface of portion 43d sliding on the switch actuating plunger 64 without moving it in or out as would be necessary to actuate the switch. If the surface of portion 43d is not vertical as would be the case if bulb temperature is above or below mid-range, equal movements of the two expansible chambers due to ambient change would result in movement of the plunger. Such equal movement does not occur, however, because at low bulb temperature the volume of the sensing chamber is less than the volume of the compensating chamber, and ambient temperature changes will have less effect on the volume of the sensing chamber than on the compensating chamber. For example, at low bulb temperature (and corresponding switch position as determined by control dial 75) an increase in ambient temperature will raise the bracket 37 a predetermined amount and will raise the left-hand end of lever 43 a smaller predetermined amount. This will result in some counter-clockwise rotation of the lever 43 in the bracket 37 tending to move the lever portion 43d away from the switch plunger 64. At the same time, however, the lever portion 43d will be raised, and due to its upper end being tilted to the left the new point of engagement with the switch plunger 64 will be at the same lateral position as the original point of engagement. The opposite will be true if ambient temperature is lowered. Also, the inverse of the given example will be true at high bulb and a reduction in ambient temperature. Complete compensation for changes in ambient temperature is attained in the illustrative embodiment of the invention except for such factors as manufacturing tolerances. Several factors must be coordinated to attain the desired result, including volumes to the bulb and the expansible chambers, the liquid fill employed, the length of the lever arm on which the sensing chamber acts, and the distance between the lever pivot and point of switch engagement.

Figure 4:
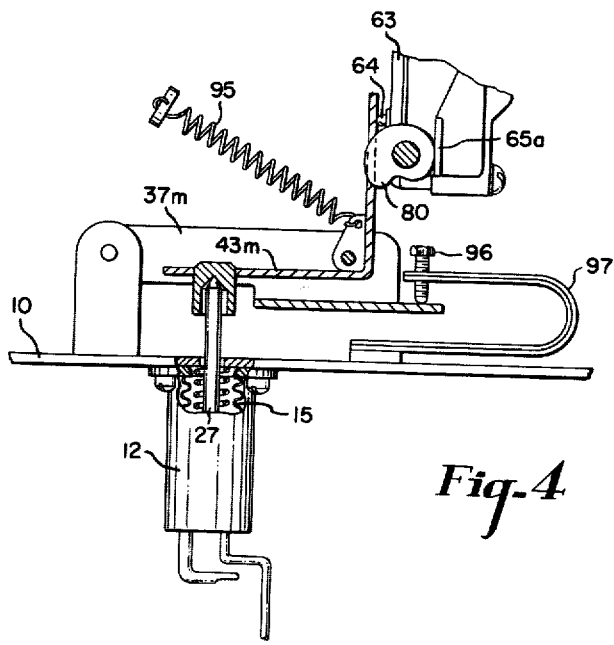
FIGURE 4 is a view, in part diagrammatic, of a modified form of the invention.

A modified form of the invention is shown in FIGURE 4. Parts corresponding to FIGURES 1 to 3 are similarly identified. The sensing expansible chamber comprising housing 12 and bellows 15 acts through plunger 27 on a lever 43m which is pivoted in a bracket 37m, which, in turn, is pivoted in a bracket in the case 10. A spring 95 biases both lever and bracket in a counterclockwise direction to hold the lever in engagement with the plunger 27 and to hold the righthand end of the bracket against an adjusting screw 96 carried by a bimetal element 97 carried by case 10. No provision is made to compensate for ambient temperature of the entire sensing capillary, but compensation is substantially complete for the sensing expansible chamber. In this modification the bracket and levers pivot about axes that are parallel rather than perpendicular and some error is introduced due to the path through which the lever pivot moves. This error is negligible in practice. Ideally the pivotal axis of the lever should be translated rather than move about some pivotal axis as in the illustrative embodiment. By providing sufficient distance to the axis provided, however, the error introduced can be made negligible.

Any type of motion receiving means could be substituted for the switch plunger. For example, a member that moves in the adjusted path of the switch plunger in the illustrative embodiment but that actuates some indicating means or performs a different type of control function could be employed.

I claim:

1. A temperature indicating controller, the combination comprising: a housing; a force transfer mechanism operatively connected to said housing and including a first lever and a second lever, said first lever arranged to be rotated about a first axis, said second lever pivotally carried by said first lever and arranged to be rotated about a second axis perpendicular to said first axis; a first fluid filled expansible chamber responsive to a temperature sensed by a remote bulb operatively connected thereto as well as responsive to ambient temperature, said first expansible chamber being operatively secured to said housing and including an output member acting on a portion of a first arm of said second lever removed from the second axis thereof, a second fluid filled expansible chamber responsive to ambient temperature only, said second chamber being operatively secured to said housing and including an output member parallel to the output member of said first chamber and acting on said first lever and through the second axis of said second lever; a snap switch including a plunger disposed in said housing and arranged to be rotated about a third axis parallel to said second axis; a second arm of said second lever perpendicular to the first arm thereof disposed proximate to the plunger of said switch; temperature control point setting means, including indicia means, for positioning said switch about said third axis; actual temperature indicating means including indicia means and further including a pinion supported from said first lever and a gear sector provided on said second lever, said temperature indicating means arranged to be positioned upon relative movement betwen said first lever and said second lever caused by a change in temperature sensed by the bulb; said indicia means arranged with respect to said housing so the temperature control point and the actual temperature are each displayed through appropriate openings in said housing; said switch arranged to be actuated by the second arm of said second lever as a result of rotation thereof caused by the temperature control point being sensed by the bulb, changes in ambient temperature being effective to vary the length of the lever arm between the second axis of said second lever and the portion of the second arm thereof arranged to cooperate with said switch to thereby effectively compensate for said changes in ambient temperature.

2. A temperature indicating controller, the combination comprising: a force transfer mechanism including a first lever and a second lever, said first lever arranged to be rotated about a first axis, said second lever pivotally carried by said first lever and arranged to be rotated about a second axis perpendicular to said first axis; a first fluid filled expansible chamber responsive to a temperature sensed by a remote bulb operatively connected thereto as well as responsive to ambient temperature, said first chamber including an output member acting on a portion of a first arm of said second lever removed from the second axis thereof; a second fluid filled expansible chamber responsive to ambient temperature only, said second chamber including an output member parallel to the output member of said first chamber and acting on said first lever through the second axis of said second lever; a switch, the actuator thereof disposed proximate a second arm of said second lever perpendicular to the first arm thereof; temperature indicating means including indicia means and further including a pinion supported from said first lever and a gear sector provided on said second lever, said temperature indicating means arranged to be positioned upon relative movement between said first lever and said second lever caused by a change in temperature sensed by the bulb; the actuator of said switch being arranged to be actuated by the second arm of said second lever as a result of rotation thereof caused by the temperature control point being sensed by the bulb, changes in ambient temperature being effective to vary the length of the lever arm between the second axis of said second lever and the portion of the second arm thereof arranged to cooperate with said switch to thereby effectively compensate for said changes in ambient temperature.

3. A temperature indicating controller, the combination comprising: a first lever arranged to be rotated about a first axis; a second lever pivotally carried by said first lever and arranged to be rotated about a second axis perpendicular to said first axis; a first fluid element responsive to a temperature sensed by a remote bulb operatively connected thereto as well as ambient temperature, said first fluid element acting on a portion of a first arm of said second lever removed from the second axis thereof; a second fluid element responsive to ambient temperature only, said second fluid element acting on said first lever and through the second axis of said second lever; a switch disposed proximate a second arm of said second lever perpendicular to the first arm thereof; temperature indicating means, including indicia means, associated with said first lever and said second lever operable upon relative movement therebetween caused by a change in temperature sensed by the probe; said switch being actuated by the second arm of said second lever as a result of rotation thereof caused by the temperature being sensed by the bulb, changes in ambient temperature being effective to vary the length of the lever arm between the second axis of said second lever and the portion of the second arm thereof arranged to cooperate with said switch to thereby effectively compensate for said changes in ambient temperature.

4. A temperature indicating controller, the combination comprising: a first lever arranged to be moved in opposite directions; a second lever pivotally carried by said first lever and arranged to be rotated about an axis substantially parallel to the plane of movement of said first lever; a first fluid element responsive to a temperature sensed by a remote bulb operatively connected thereto as well as ambient temperature, said first fluid element acting on a portion of a first arm of said second lever removed from the pivotal axis thereof; a second fluid element responsive to ambient temperature only, said second fluid element acting on the first lever and through the pivotal axis of said second lever; a switch disposed proximate a second arm of said second lever perpendicular to the first arm thereof; temperature indicating means including indicia means associated with said first lever and said second lever operable upon relative movement therebetween caused by a change in temperature sensed by the bulb; said switch being actuated by the second arm of said second lever as a result of rotation thereof caused by the temperature being sensed by the bulb, changes in ambient temperature being effective to vary the length of the lever arm between the axis of said second lever and the portion of the second arm thereof arranged to cooperate with said switch to thereby effectively compensate for said changes in ambient temperature.

5. An ambient temperature compensation arrangement for an expansible fluid type temperature control device, the combination comprising: a right angle bell crank lever arranged to be rotated about its pivotal axis and further arranged to be moved so the pivotal axis of said lever is moved in opposite directions substantially perpendicular to a first arm of said lever and substantially parallel to the second arm of said lever; a first fluid element responsive to a temperature sensed by a remote probe operatively connected thereto as well as responsive to ambient temperature; said first fluid element acting on a portion of the second arm of said bell crank lever removed from the pivotal axis thereof; a second fluid element responsive to ambient temperature only, said second fluid element acting through the pivotal axis of said bell crank lever; and control means arranged proximate to the second arm of said bell crank lever so as to be acted on as a result of rotation of said lever caused by a predetermined temperature sensed by the probe being attained; changes in ambient temperature being effectively compensated by varying the length of the lever arm between the pivotal axis of said lever and the portion of the second arm of said lever acting upon said control means.

6. An ambient temperature compensation arrangement for an expansible fluid type temperature control device, the combination comprising: a member arranged to be rotated about an axis and further arranged to be moved so the axis is moved in opposite directions substantially perpendicular to a first portion of said member and substantially parallel to a second portion of said member; a first fluid element responsive to a temperature sensed by a remote probe operatively connected thereto as well as responsive to ambient temperature; said first fluid element acting on a first portion of said member removed from the axis thereof; a second element responsive to ambient temperature only, said second element acting through the axis of said member; and control means arranged proximate to the second portion of said member so as to be acted on as a result of rotation of said member caused by a predetermined temperature sensed by the probe being attained; changes in ambient temperature being effectively compensated by varying the length of the lever arm between the axis of said member and the segment of the second portion of said member acting upon said control means.

7. An ambient temperature compensation arrangement for an expansible fluid type temperature responsive device, the combination comprising a first fluid element responsive to a temperature sensed by a remote probe operatively connected thereto as well as responsive to ambient temperature; a second element responsive to ambient temperature only; control means; and force transfer means; said force transfer means arranged to be rotated about a pivotal axis with respect to said control means upon changes in temperature sensed by the probe and changes in ambient temperature, said force transfer means further arranged to be translated with respect to said control means upon changes in ambient temperature so as to vary the length of the lever arm between the pivotal axis of said member and the portion thereof associated with said control means.

8. In an ambient temperature compensated fluid transmission system, a fluid filled sensing element comprising a transmitting chamber, a tube and an expansible receiving chamber, a fluid filled compensating element comprising a tube disposed adjacent the tube of the sensing element and a second expansible chamber, a member translated by equal movement of said expansible chambers and rotated by unequal movement thereof, and motion receiving means movable transversely of the movement in the plane of movement of said fluid receiving chambers and of said member, said member having a substantially plane surface portion adapted to engage said motion receiving means with the plane surface normally substantially perpendicular to the path of movement of said motion receiving means and parallel to the paths of movement of said expansible chambers.

9. In an ambient temperature compensated fluid transmission system, a fluid filled sensing element comprising a transmission chamber, a connecting tube and an expansible receiving chamber having a movable portion, a compensating element adjacent said expansible chamber and comprising a temperature sensing portion and a portion movable thereby in response to ambient temperature, a member translated by equal movements of the movable portions of said elements and rotated by unequal movements thereof, and motion receiving means movable transversely of the paths of movement of said movable portions, said member having a generally plane surface portion adapted to engage said motion receiving means with the plane surface disposed transversely of the path of movement of said motion receiving means.

10. In an ambient temperature compensated hydraulic transmission system, a liquid filled sensing element comprising a transmission chamber, a connecting tube and an expansible receiving chamber having a movable portion, a switch having an actuating plunger movable in a line substantially normal to the path of movement of the movable portion of said chamber, a bell crank lever having one arm engaging the movable portion of said chamber and its other arm engaging said plunger, a temperature sensitive compensating element having a movable portion, and means connecting the movable portion of said compensating element and the pivot of said bell crank lever and arranged to move said lever toward and away from the line of movement of said switch plunger on changes in ambient temperature.

11. In an ambient temperature compensated hydraulic transmission system, a liquid filled sensing element comprising a transmitting chamber, a connecting tube and an expansible receiving chamber, a bell crank lever having a first arm positioned by said expansible chamber, motion receiving means having a portion engaging the second arm of said bell crank lever and guided for movement in a path substantially normal to the path of movement of said liquid receiving chamber, and a temperature sensitive compensating element effective to move the pivotal axis of said bell crank lever toward and away from the path of movement of said portion of said motion receiving means.

References Cited in the file of this patent
UNITED STATES PATENTS

| | | |
|---|---|---|
| 2,050,965 | De Giers | Aug. 11, 1936 |
| 2,520,370 | Offutt | Aug. 29, 1950 |
| 2,549,054 | Burling | Apr. 17, 1951 |
| 2,797,272 | Leupold | June 25, 1957 |
| 2,878,580 | Hughes | Mar. 24, 1959 |
| 2,889,432 | Miller | June 2, 1959 |
| 2,929,901 | Bloch | Mar. 22, 1960 |

UNITED STATES PATENT OFFICE
CERTIFICATE OF CORRECTION

Patent No. 3,095,487                                June 25, 1963

Veikko J. Jokela

It is hereby certified that error appears in the above numbered patent requiring correction and that the said Letters Patent should read as corrected below.

Column 7, lines 23 and 24, strike out "in the plane of movement of said fluid receiving chambers and" and insert the same after "movable" in line 23, same column 7.

Signed and sealed this 21st day of April 1964.

(SEAL)
Attest:
ERNEST W. SWIDER

EDWARD J. BRENNER

Attesting Officer

Commissioner of Patents